United States Patent [19]
Amamori et al.

[11] Patent Number: 5,431,439
[45] Date of Patent: Jul. 11, 1995

[54] AIR BAG DEVICE FOR PASSENGER

[75] Inventors: Ichiro Amamori; Akira Kokeguchi, both of Shiga, Japan

[73] Assignee: Takata Corporation, Tokyo, Japan

[21] Appl. No.: 280,657

[22] Filed: Jul. 27, 1994

[51] Int. Cl.⁶ .............................................. B60R 21/16
[52] U.S. Cl. .................................................... 280/732
[58] Field of Search ............... 280/728 A, 728 B, 732, 280/738

[56] References Cited

U.S. PATENT DOCUMENTS

| | | | |
|---|---|---|---|
| 5,069,480 | 12/1991 | Good | 280/728 A |
| 5,145,207 | 9/1992 | Bederka et al. | 280/728 A |
| 5,306,042 | 4/1994 | Frank | 280/732 |

Primary Examiner—Margaret A. Focarino
Assistant Examiner—Paul N. Dickson
Attorney, Agent, or Firm—Kanesaka & Takeuchi

[57] ABSTRACT

In order to sufficiently absorb the impact applied to a container from upward, the top surface of the container is made of a sheet separately from the other portion. Lugs projected from the top surface are welded to the side surfaces of the container, while lugs-projected from the side surfaces are welded to the underside of the top surface. When an impact is applied to the container from upward, deformation of the container easily begins from the side surfaces, so that a large amount of impact energy is absorbed.

3 Claims, 6 Drawing Sheets

AIR BAG DEVICE FOR PASSENGER

BACKGROUND OF THE INVENTION

1. Field of the Invention

The present invention relates to an air bag device for a passenger which is provided on an instrument panel of a vehicle and which inflates the air cushion so as to protect the passenger on the passenger seat at the time of a collision.

2. Description of the Related Art

An air bag device for a passenger is composed of a folded air cushion accommodated in a container, an inflator and a module cover provided in such a manner as to cover the air cushion. At the time of a collision of a vehicle, the inflator is operated so as to inflate the air cushion, which presses and tears the module cover to open and, as a result, the air cushion is largely deployed in the cabin.

FIGS. 5 to 7 show a conventional air bag device having a lid mounting bracket attached to the container so as to mount a lid. FIG. 5 is a schematic perspective view of the entire structure of an air bag device with the air cushion kept folded, FIG. 6 is a perspective view of the container, and FIG. 7 is a sectional view of the container shown in FIG. 6 taken along the line VII—VII.

In an air bag device 10, a lid 14 is attached to the open front surface of a box-shaped container 12, and an inflator 16 is secured to the container 12. A folded air cushion 18 is inserted into the container 12 and secured thereto by bolts 19.

A multiplicity of inlet holes 20 are formed in the top surface 12a and the bottom surface 12b of the container 12. When the inflator 16 is operated so as to spout gas into the container 12 and inflate the air cushion 18, fresh air passes through the inlet holes 20 and flows into the container 12, thereby accelerating the inflation of the air cushion 18.

The lid 14 is provided with a backup plate 22 made of an aluminum alloy or the like, and a soft cover 24 attached to the front surface of the backup plate 22. The upper edge portion of the backup plate 22 extends above the container 12 and serves as a lid mounting portion 26.

A lid mounting bracket 28 is secured to the top surface 12a of the container 12 by spot welding or the like. The lid mounting bracket 28 extends along the top surface 12a of the container 12, and the lid mounting portion 26 is anchored to the lid mounting bracket 28 by bolts 34 and nuts.

The top surface 12a of the container 12 is formed in the shape of a plate separately from the other portions of the container 12. As shown in FIGS. 6 and 7, lugs 30 are provided toward the top surface 12a from the top portions of the side surfaces 12S of the container 12, and the top surface 12a is secured to the underside of the lugs 30 by spot welding.

The inflator 16 is secured to the container 12 by an inflator cover 38. The inflator cover 38 is fixed to the container 12 by bolts 40.

It is provided in federal regulation that an instrument panel should be dented so as to absorb the impact when the passenger plunges into the instrument panel. (regulations with regard to the impact absorption of an instrument panel). The air bag device for a passenger must also conform to the regulations. Accordingly, the container of an air bag device for a passenger deforms so as to absorb the impact energy when it receives a large impact.

OBJECTS AND SUMMARY OF THE INVENTION

It is an object of the present invention to provide an air bag device for a passenger, which can absorb impact applied to the instrument panel.

The present invention provides an air bag device for a passenger which comprises: a box-shaped container with an open front portion; a folded air cushion accommodated in the container; an inflator attached to the container; a lid covering the front portion of the container; lugs provided on the side edges of the top surface of the container and connected to the side surfaces of the container; and lugs provided on the upper edges of the side surfaces of the container and connected to the top surface of the container, wherein the top surface of the container is made of a sheet separately from the other portion of the container.

In an air bag device for a passenger according to the present invention, since the connecting portions of the top surface and the side surfaces have such a high rigidity that the side surfaces of the container deform to a greater extent than in the related art and the impact energy absorbed by the entire container increases when an impact is applied from upward.

The above and other objects, features and advantages of the present invention will become clear from the following description of the preferred embodiment thereof, taken in conjunction with the accompanying drawings.

DESCRIPTION OF THE PREFERRED EMBODIMENT

An embodiment of an air bag device for a passenger according to the present invention will now be explained with reference to the drawings.

Figure 1:
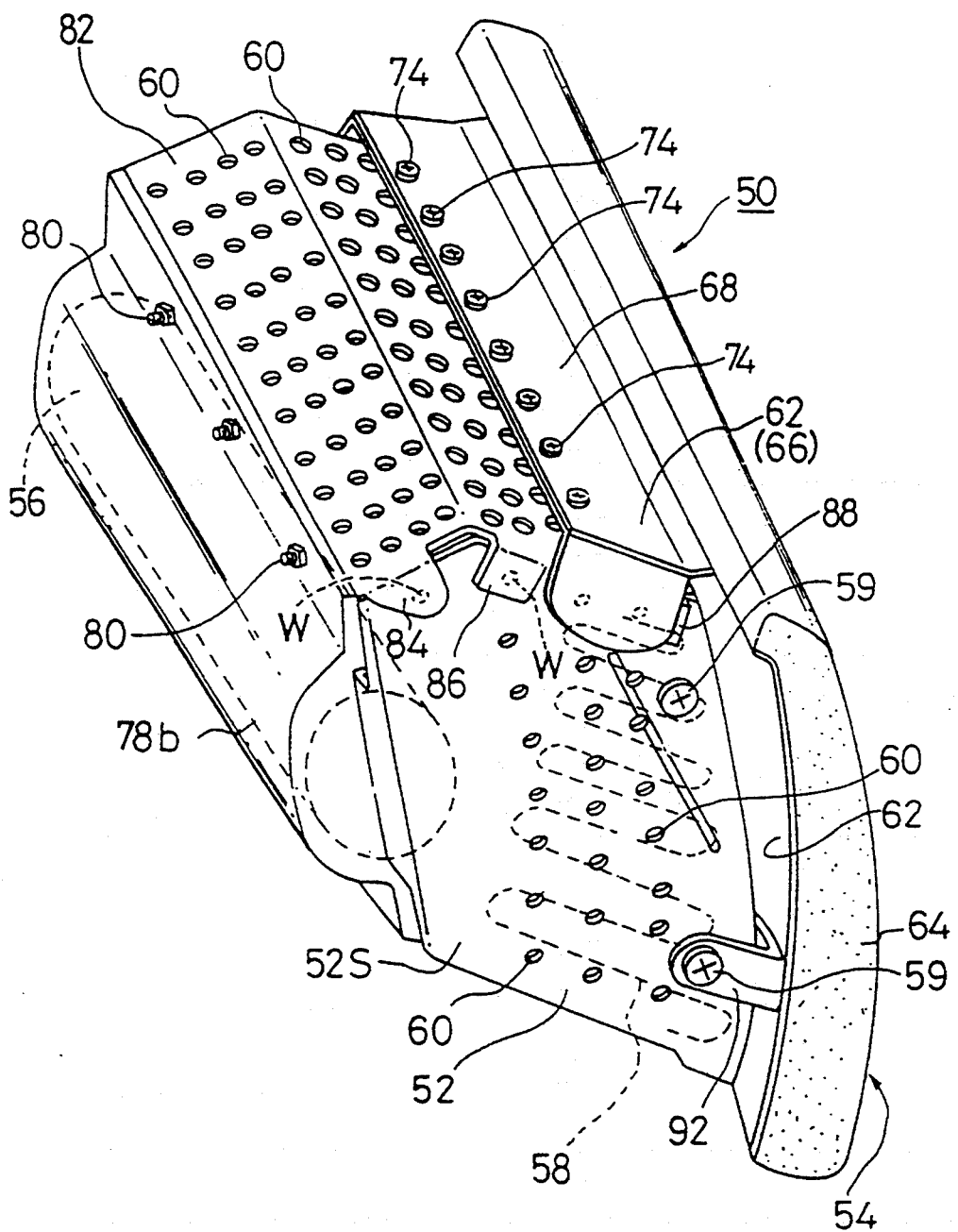
FIG. 1 is a perspective view of an embodiment of an air bag device for a passenger according to the present invention.
Figure 2:
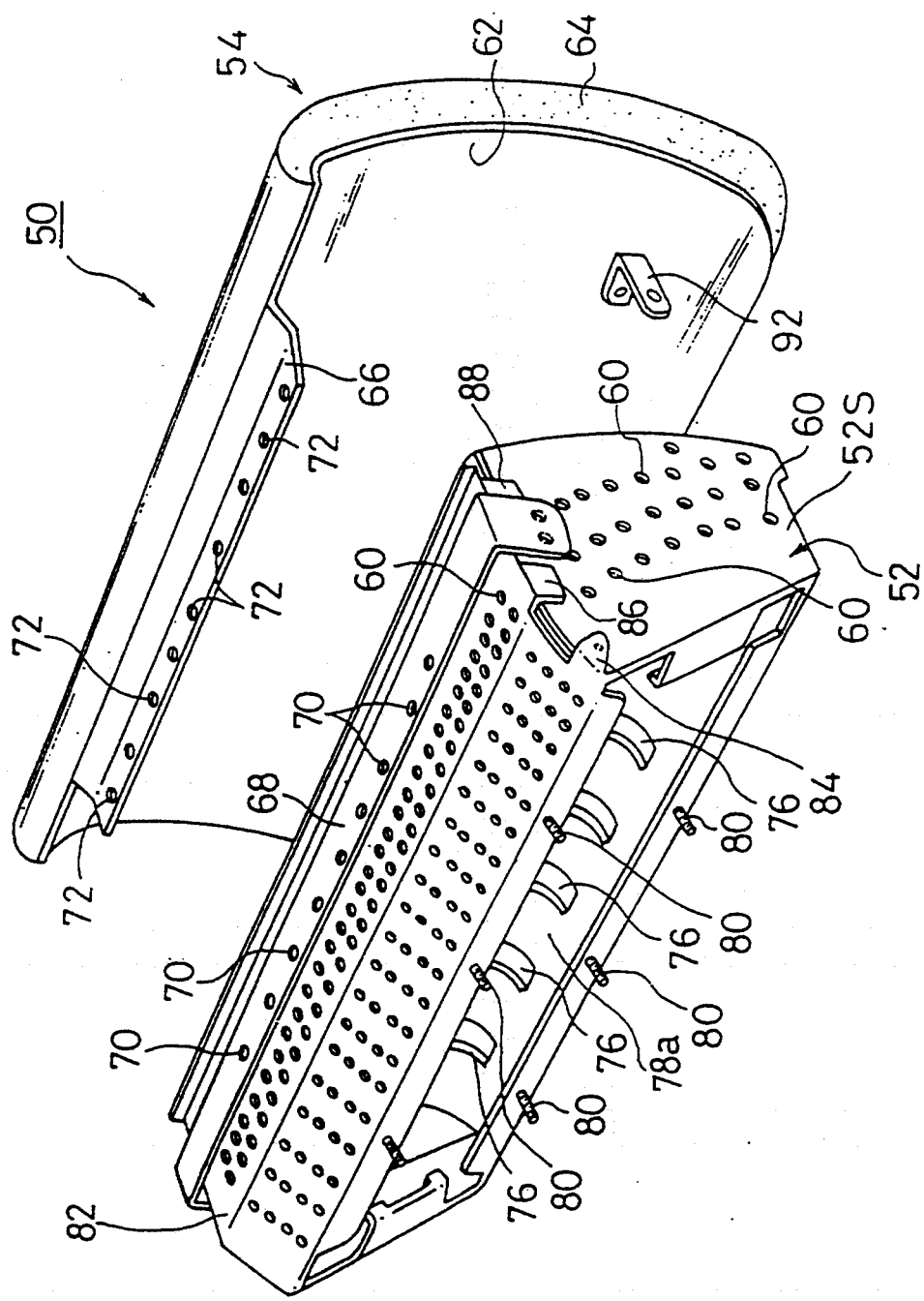
FIG. 2 is an exploded perspective view of the embodiment shown in FIG. 1.
Figure 3:
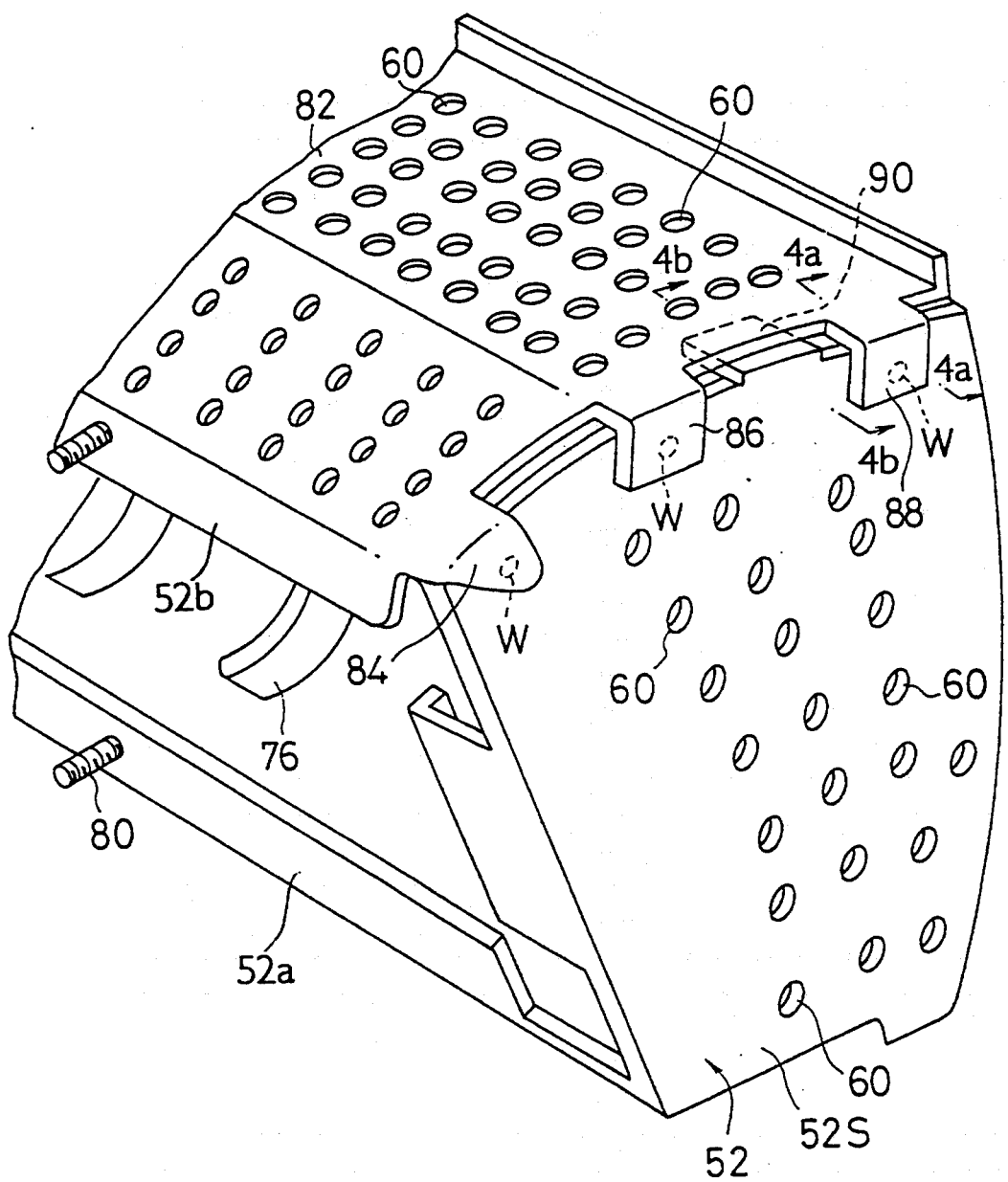
FIG. 3 is a perspective view of the main part of the embodiment shown in FIG. 1.
Figure 4:
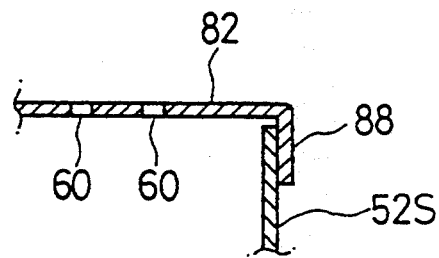
FIG. 4a is a sectional view of the main part taken along a line 4a—4a in FIG. 3.
FIG. 4b is a sectional view taken along a line 4b-4b in FIG. 3.
Figure 4:
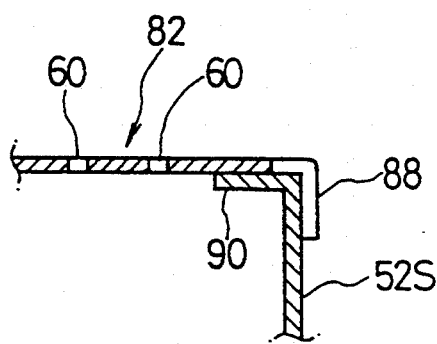
Figure 5:
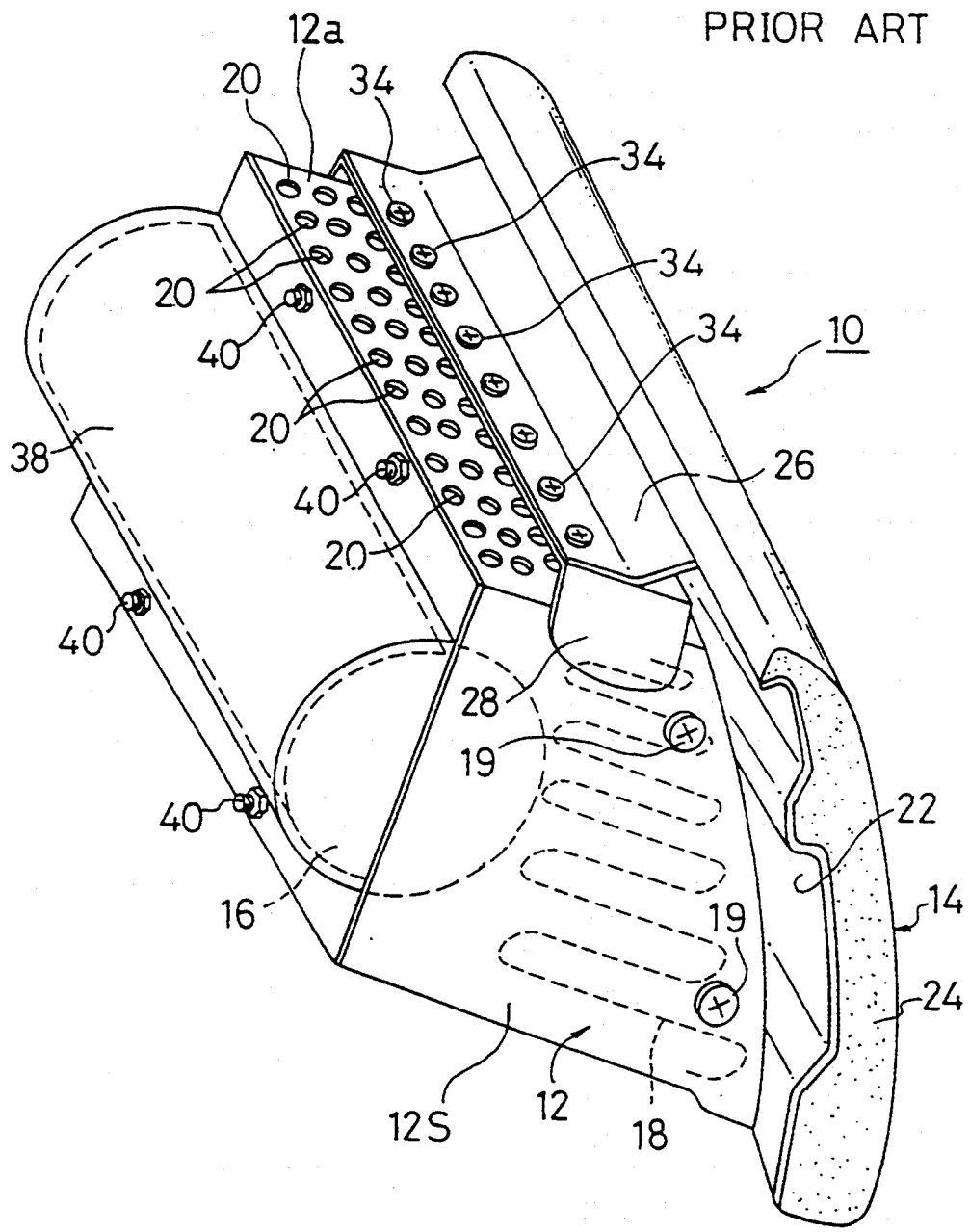
FIG. 5 is a perspective view of a conventional air bag device for a passenger.
Figure 6:
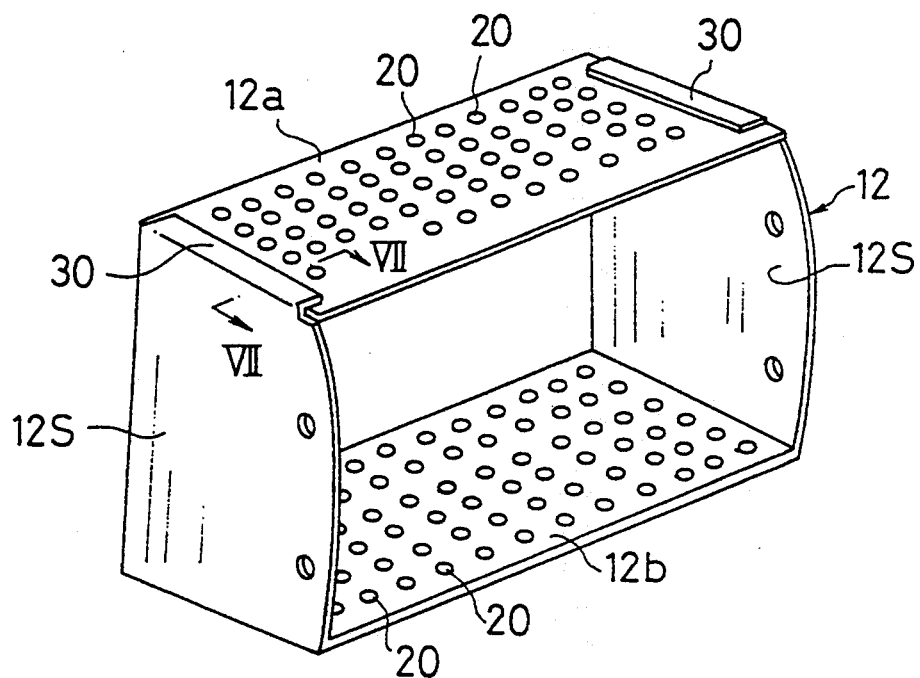
FIG. 6 is a perspective view of the container of an air bag device for a passenger shown in FIG. 5.
Figure 7:
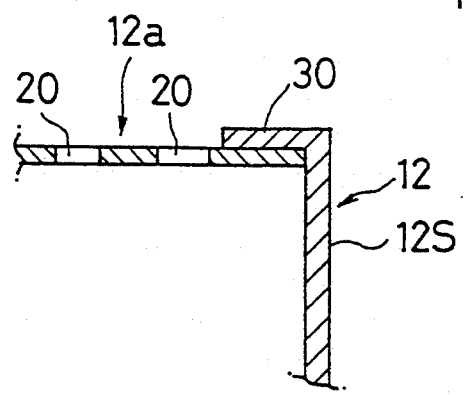
FIG. 7 is a cross sectional view of the container shown in FIG. 6, taken along the line VII—VII.

FIGS. 1 to 4 show the embodiment of an air bag device for a passenger according to the present invention, wherein FIG. 1 is a perspective view of an air bag device 50 showing the entire structure thereof, FIG. 2 is an exploded perspective view thereof, FIG. 3 is a perspective view of the main part of the container, and FIGS. 4a and 4b are sectional views of the main part shown in FIG. 3, taken along the lines 4a—4a and 4b—4b, respectively.

A lid 54 is attached to the open front portion of a box-shaped container 52, and an inflator 56 is anchored to the container 52. A folded air cushion 58 is inserted into the container 52 and fixed to the container 52 by bolts 59.

A multiplicity of inlet holes 60 are formed in the top surface, the side surfaces and the bottom surface of the container 52. When the inflator 56 is operated so as to spout gas into the container 52 and inflate the air cushion 58, fresh air passes through the inlet holes 60 and flows into the container 52, thereby accelerating the inflation of the air cushion 58.

The lid 54 is provided with a backup plate 62 made of an aluminum alloy or the like, and a soft cover 64 attached to the front surface of the backup plate 62. The upper edge portion of the backup plate 62 projects above the container 52 and serves as a lid mounting portion 66.

A lid mounting bracket 68 is provided along the top surface of the container 52, and both longitudinal ends of the lid mounting bracket 68 are bent in the form of a letter L along the side surfaces of the container 52 and secured to the side surfaces by spot welding.

The lid mounting bracket 68 extends along the top surface of the container 52, and is provided with a multiplicity of bolt holes 70. A multiplicity of bolt holes 72 are also formed in the lid mounting portion 66, and the lid mounting portion 66 is fixed to the lid mounting brackets 68 by bolts 74 and nuts.

As shown in FIGS. 1 and 2, the back surface of the container 52 is composed of first and second back plates 78a, 78b. The back plates 78a, 78b are bent in the shape of a concave so as to receive the inflator 56 therebetween. The first back plate 78a is provided with slits 76 for introducing the gas spouted from the inflator 56 into the container 52.

The first and second back plates 78a, 78b are fixed to the bent portions 52a, 52b of the container 52 by bolts 80.

The bottom surface, the side surfaces 52S and the bent portion 52a are made of a piece of a metal sheet which is punched and bent in the shape of substantially a letter U. The top surface 82 is made of another metal sheet which is punched and bent. Lugs 84, 86 and 88 are provided on the side edge portions of the top surface 82 in such a manner as to overlap the outer surface of the upper edge portions of the side surfaces 52S. The lugs 84, 86 and 88 are secured to the side surfaces 52S by spot welding. Each symbol W in FIGS. 1 and 3 indicates the spot weld portion.

Lugs 90 projecting toward the top surface 82 so as to come into close contact with the underside of the top surface 82 are provided on the upper edge portions of the side surfaces 52S. The lugs 90 are secured to the top surface 82 by spot welding.

The reference numeral 92 denotes a connecting member for connecting the lower end of the lid 54 and the container 52. When the lid 54 is opened, the connecting member 92 is broken, thereby allowing the lid 54 to be opened from the lower end thereof.

In the air bag device for a passenger having the above-described structure, the top surface 82 and the side surfaces 52S of the container 52 are piled up with each other at the lugs 84, 86, 88 provided on the side edges of the top surface 82. They are connected by spot welding. In addition, the lugs 90 are secured to the underside of the top surface 82. Therefore, when an impact is applied from upward of the container 52, the impact is transmitted to the side surfaces 52S of the container 52 with efficiency, so that the side surfaces 52S begin to be collasped comparatively easily. The deformation (crush) of the entire container 52 including the side surfaces 52S is thus accelerated, so that the impact applied is sufficiently absorbed.

As described above, according to an air bag device for a passenger, when an impact larger than a predetermined level is applied from the cabin of a vehicle to the container, the side surfaces of the container are rapidly deformed so as to absorb the impact with efficiency.

While there has been described what is at present considered to be a preferred embodiment of the invention, it will be understood that various modifications may be made thereto, and it is intended that the appended claims cover all such modifications within the true spirit and scope of the invention.

What is claimed is:

1. An air bag device for a passenger comprising:
   a box-shaped container including an elongated bottom portion, two side portions connected to side edges of the bottom portion and having outer surfaces and upper edges, a top portion having side edges and connected to the two side portions, and an opening at a front side of the container and surrounded by the bottom, side and top portions, said bottom and two side portions being formed of one metal sheet as one unit and said top portion being formed of a metal sheet separately from the bottom and two side portions,
   a folded air cushion situated in said container,
   an inflator attached to the container,
   a lid for covering said opening and connected to the container,
   first lugs integrally formed with the top portion on each side edge thereof oriented substantially perpendicularly to the top portion and extending toward the bottom portion, said first lugs being located on the outer surfaces of the side portions and connected therewith, and
   second lugs integrally formed with the side portions at the upper edges thereof oriented substantially perpendicularly to the side portions and extending inwardly of the container, said second lugs being located beneath the top portion and connected therewith so that when an impact is applied to the container, the side portions receive the impact and are deformed to absorb the impact.

2. An air bag device according to claim 1, wherein said first lugs on each side edge are spaced apart from each other, and each second lug is located between the first lugs.

3. An air bag device according to claim 2, wherein said first and second lugs are fixed to the side and top portions, respectively, by spot weldings.

* * * * *